US005435641A

United States Patent [19]
Dumon Dupuis et al.

[11] Patent Number: 5,435,641
[45] Date of Patent: Jul. 25, 1995

[54] CABINET FOR ELECTRICAL EQUIPMENT

[75] Inventors: Michel Dumon Dupuis, Barcelona; Lluis Xaus Regordosa, Igualada, both of Spain

[73] Assignee: Merlin Gerin, Meylan, France

[21] Appl. No.: 88,260

[22] Filed: Jul. 7, 1993

[30] Foreign Application Priority Data

Jul. 15, 1992 [ES] Spain .................................. 9202234

[51] Int. Cl.⁶ .............................................. A47B 81/00
[52] U.S. Cl. .................. 312/223.1; 312/229; 220/467; 49/479.1; 49/483.1; 109/85; 109/79; 109/75; 109/59 R
[58] Field of Search ..................... 312/223.1, 100, 229, 312/400; 220/467; 49/479.1, 476.1, 483.1; 109/85, 79, 78, 73, 65, 75, 77, 45, 59 R, 59 T

[56] References Cited

U.S. PATENT DOCUMENTS

| 3,142,522 | 7/1964 | Hall et al. | 312/100 |
| 3,489,477 | 1/1970 | Harder | 220/467 |
| 3,797,903 | 3/1974 | Traulsen | 312/408 |
| 3,846,608 | 11/1924 | Valles | 49/479.1 |
| 3,912,348 | 10/1975 | Seymour | 312/296 |
| 4,550,667 | 11/1985 | Meyers | 109/85 |
| 4,665,654 | 5/1987 | Stedron et al. | 49/483.1 |
| 5,232,277 | 8/1993 | Cassady et al. | 312/296 |

FOREIGN PATENT DOCUMENTS

| 263754 | 4/1988 | European Pat. Off. | 361/724 |
| 1023866 | 3/1966 | United Kingdom | 312/223.1 |

*Primary Examiner*—Kenneth J. Dorner
*Assistant Examiner*—Janet M. Wilkens
*Attorney, Agent, or Firm*—Darby & Darby

[57] ABSTRACT

A cabinet formed from a unitary open-faced cubicle structure having two lateral walls, an upper wall, a bottom wall, and a rear wall. A door closes the open face of the structure. The cabinet has at least one chimney along one lateral wall, the chimney extending from the front, open face to the rear wall of the cabinet. The chimney opens at both the rear wall of the structure and the front face of the structure. The opening at the front face is positioned to receive a lock carried by the door. Therefore, the lock is isolated from the interior of the cabinet, and the interior is protected from entry of dust and moisture. The cabinet also has a flashing system in the vicinity of its edges, which prevents entry of water into the interior of the cabinet. Additionally, the cabinet has edges in the vicinity of the door that provide additional pressure on seals within the door. Within the cabinet are provided serrated structures for varying the height of cross members for securing electrical equipment within the cabinet.

13 Claims, 11 Drawing Sheets

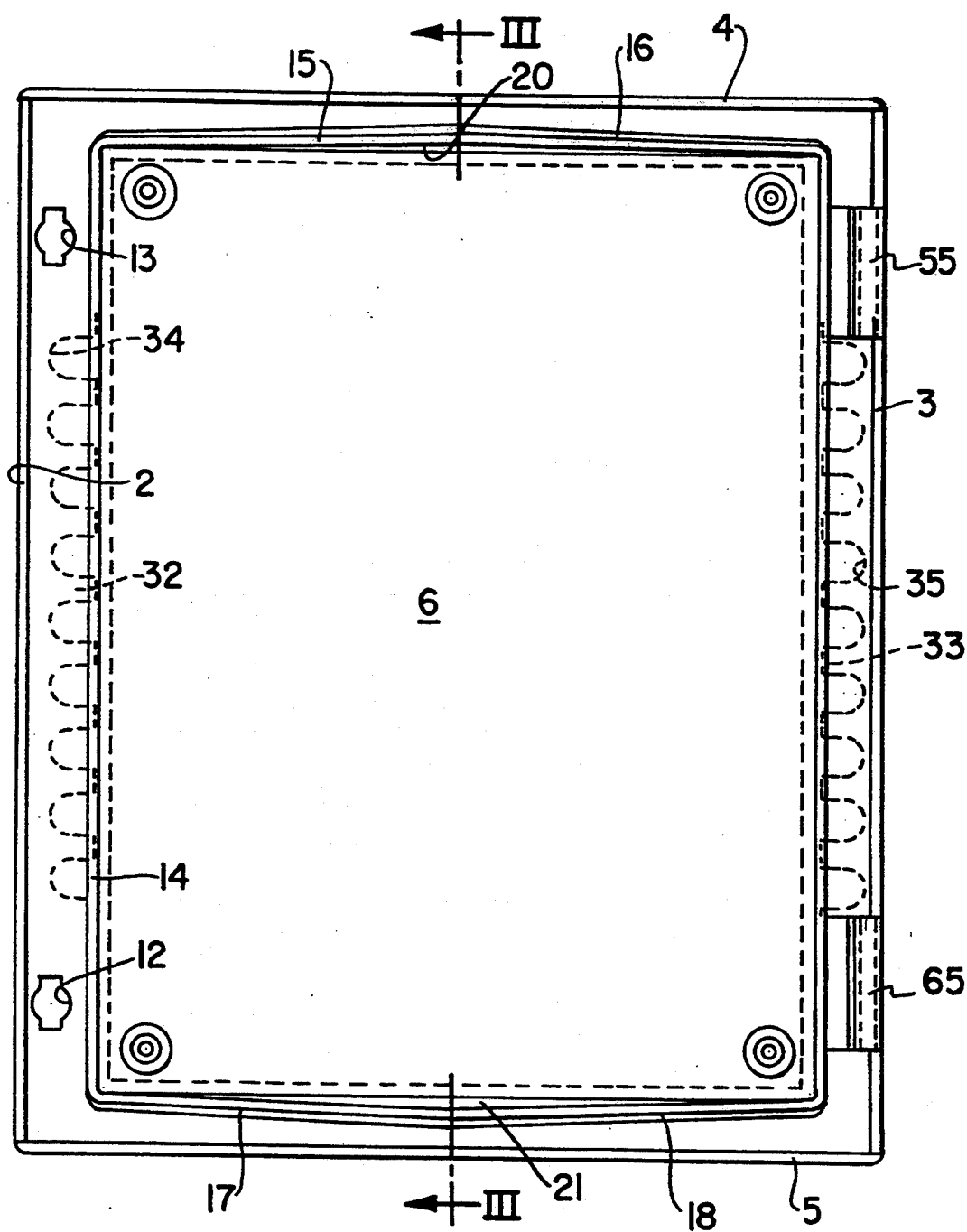

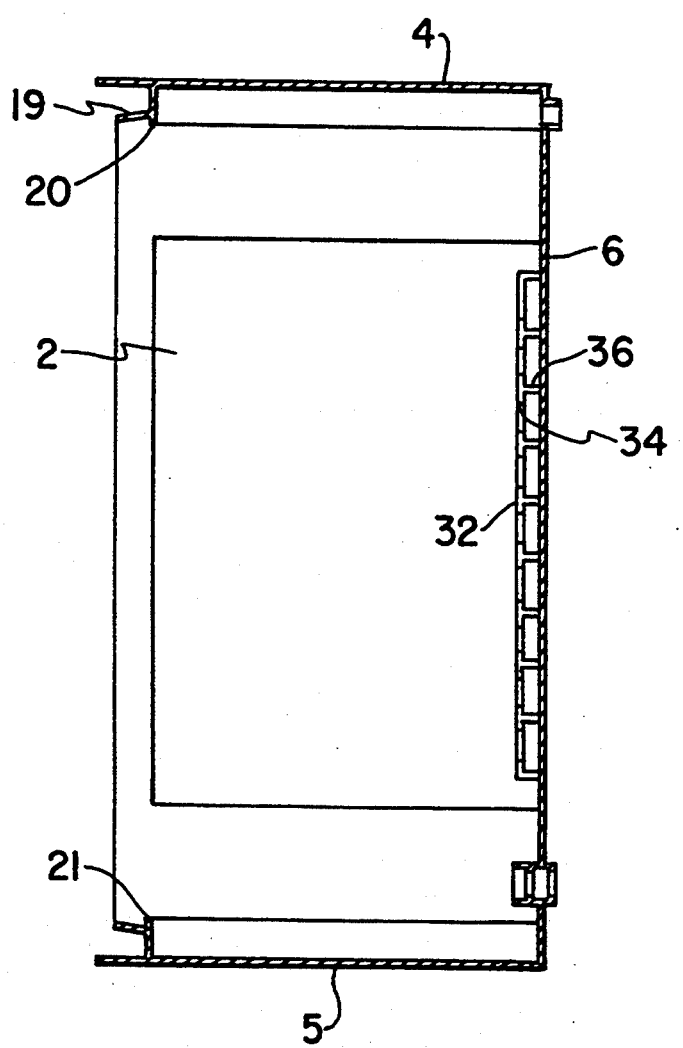

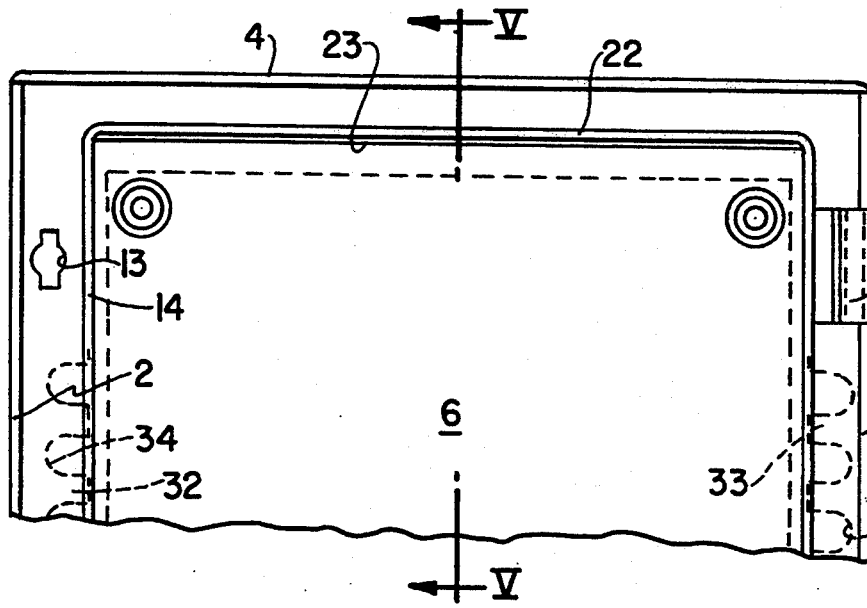
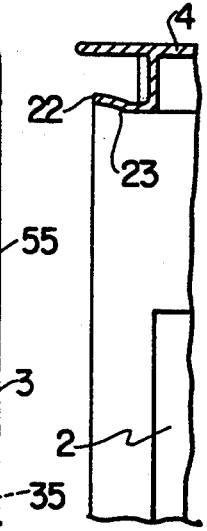
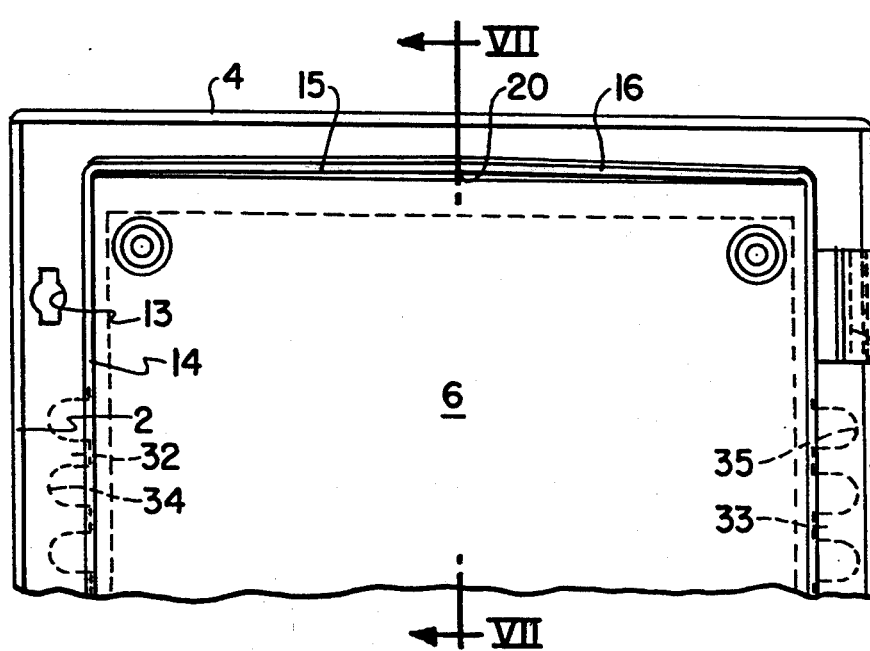
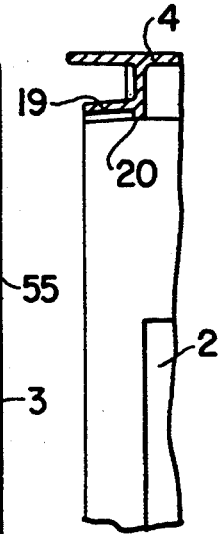

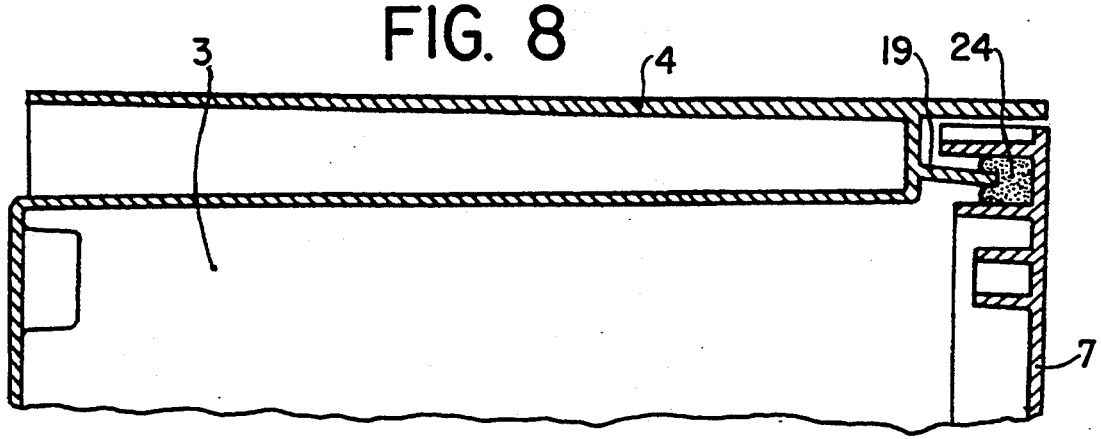
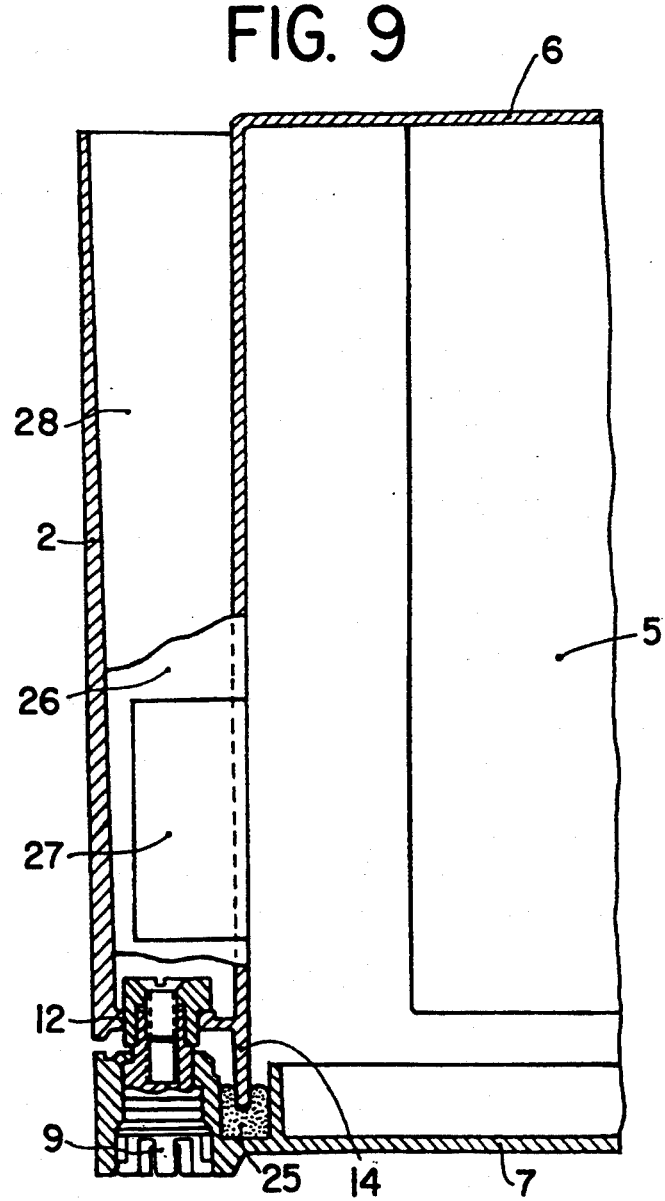

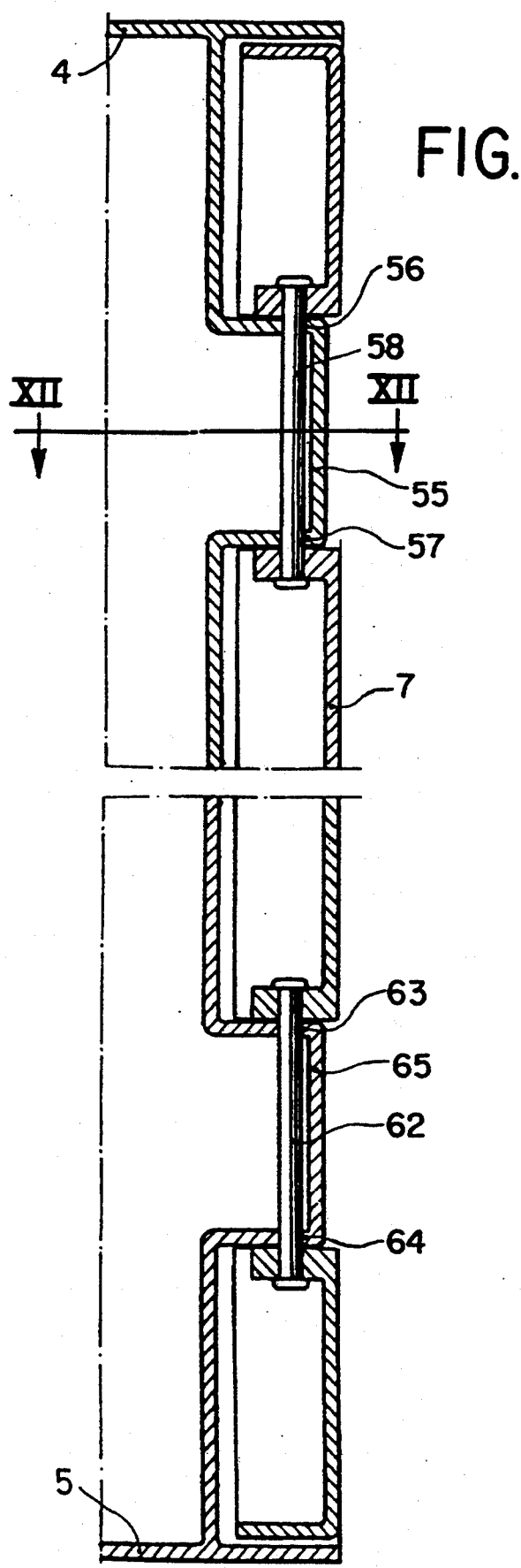

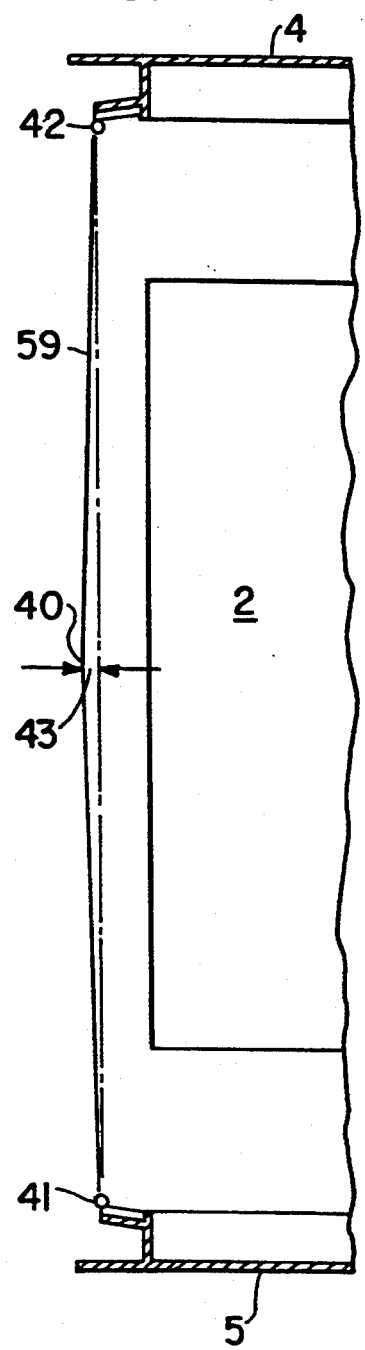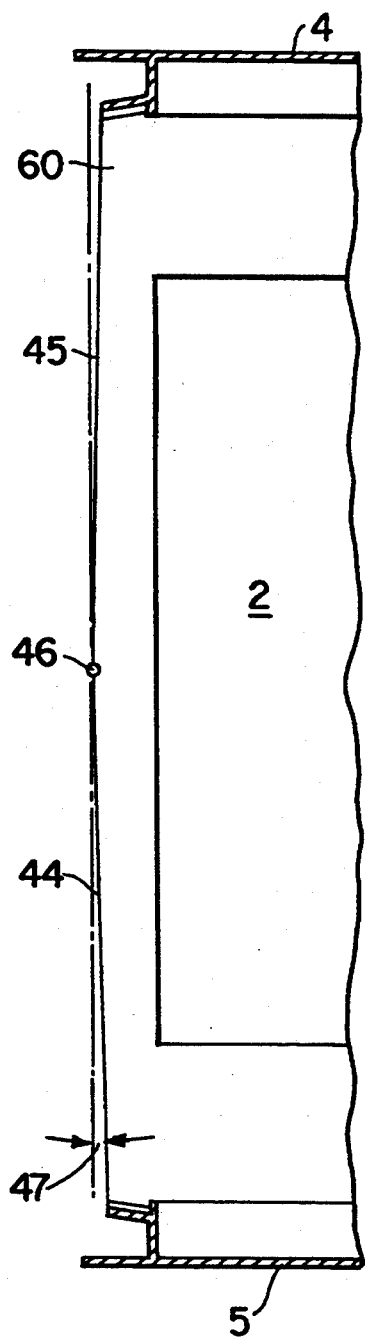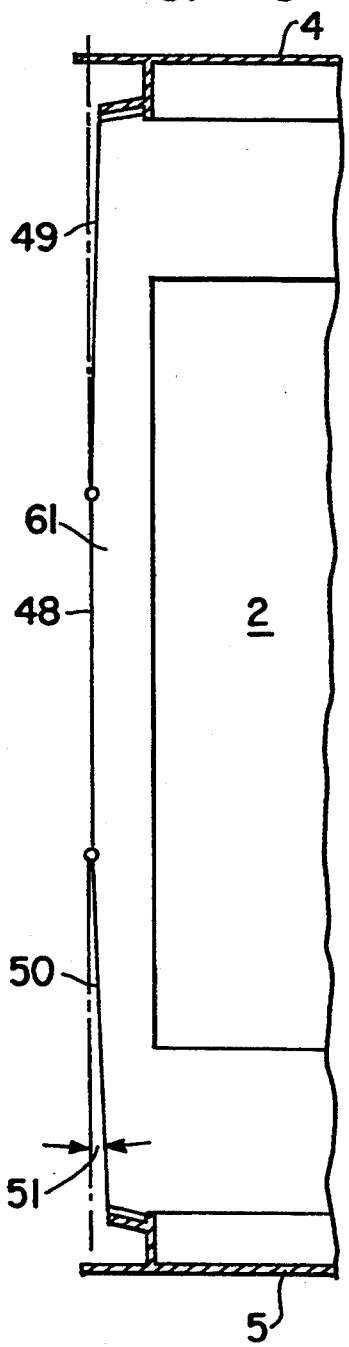

CABINET FOR ELECTRICAL EQUIPMENT

SPECIFICATION

The present invention is intended to disclose a cabinet for electrical equipment with characteristics which ate original in the light of those now known, supplying appreciable technical advantages.

The purpose of cabinets for electrical equipment is to accommodate inside them a diversity of mechanisms for electric control and operation, associated with low voltage installations which may be for lighting, power other uses. They may be installed both inside sealed enclosures and exposed to the weather, depending on the situation of the electrical installations which have be controlled and/or distributed from the cabinet.

Given the functions that are entrusted to them, electric cabinets have to operate with efficient protection for the equipment accommodated in them against all those external phenomena or influences which could affect their working. Thus, for example, equipment must be protected against external mechanical action, moisture and dust, preferably.

Furthermore, cabinets for electrical equipment must have means for allowing a change of position of the equipment accommodated inside, enabling the housing them of a variable number of apparatus or also equipment of different sizes and types.

Among the currently known cabinets there ate some in which blind holes have been made opening in the rear face of the cabinet and operating jointly with a number of ribs made in the rear face of the said cabinet, allowing the carrying out, if needed, of the ventilation of the inside of the cabinet.

However, neither in those cabinets not in those known in this field has a solution been given to the problem of the closures allowing a possible ingress of dust and moisture towards the inside of the cabinet.

The aim of the present invention is to disclose a cabinet for electrical equipment providing an efficient solution for all the problems mentioned at the same time, presenting a new concept of cabinet for electrical equipment associated with high efficiency of operation.

The cabinet which is the subject of the present invention is characterised in the first place by its construction in a compressed material of monobloc structure, being at the same time completely closed in the space accommodating the equipment as a result of the special formation of the monobloc body allowing the siting of the openings for the door locks in an area external to the opening of the space housing the electrical equipment, thus completely eliminating possible entries for dust and moisture implied by these openings which, in spite of their sealing, constitute a standard weak point for cabinets of this type.

Also, it is a characteristic of the cabinet of the invention to have hollow compartments or "chimneys" produced by moulding which open out in the rear face and which have a cross-section shaped as two rectangular areas at a right angle, two of said compartments, which are adjacent to two of the transversal edges of the cabinet ending in openings for the closures adjacent to the front opening of the cabinet. The other two compartments, which correspond to the other two of the transversal edges similarly end in the front plane, that is to say that corresponding to the opening of the cabinet, forming housings for the door hinges and possessing the corresponding openings for the hinge pins of same.

Likewise, the present invention possesses characteristics of great originality with respect to the means for the evacuation of water at the front, in providing a doubly inclined flashing system with two outflows situated in the vicinity of its edges, both upper and lower, which permits an efficient removal of water with simple means, and at the same time the turning over of the cabinet should assembly require it.

In another example of embodiment, the flashing for water removal may be provided in the form of a longitudinal channel parallel to the opening, with water collection towards the inside and discharge at the ends.

Another characteristic of the present invention resides in the provision of the bearers for the carriages intended for a variable vertical arrangement, by means of lateral dentated sections inside the equipment enclosure with blocks for simple pressure linking, to receive the cross-members.

It is also a characteristic of the cabinet of the invention to design the ribs or edges intended to be made to coincide by pressure at the vertical seals to a specific form whereby the central part of the said edges is deeper than the end areas, so that the said edges have a slight straight or curved slant from the central part towards the end edges, the pressure which they exert on the joint increasing at the centre, thus compensating the bending normally exhibited by the cabinet door at its centre, especially when size is considerable. By means of this technical step it is achieved that the pressure of the seal is appreciably equalised throughout its length.

For a clearer understanding, and for the sake of non-limitative example, explanatory drawings are enclosed for a cabinet for electrical equipment constructed according to the invention.

FIGS. 2 and 3 are two views, front open and lateral in section of the cabinet of the invention with water drainage by means of a twin-sloped partition;

Figure 10:
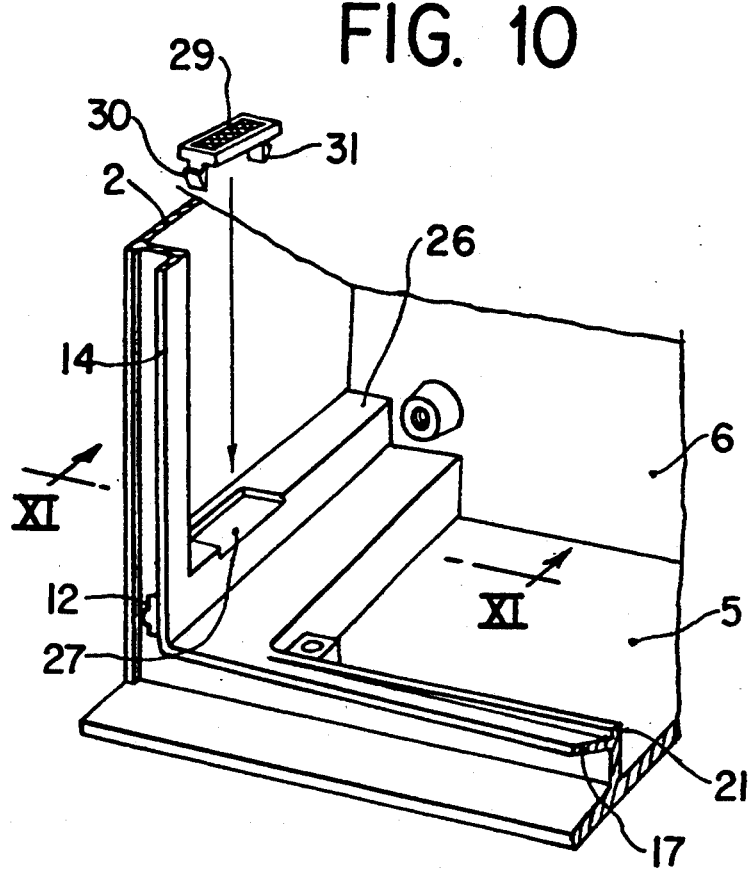
Figure 11:
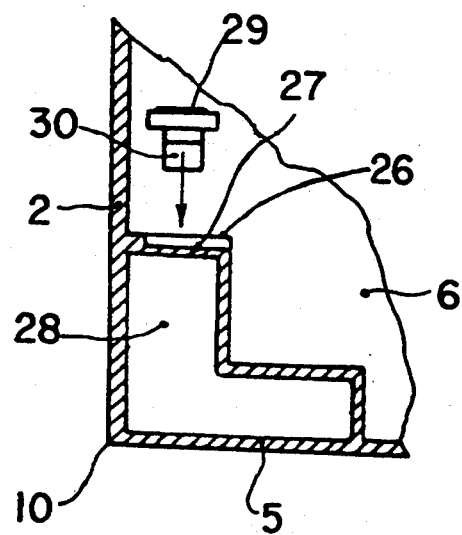
Figure 12:
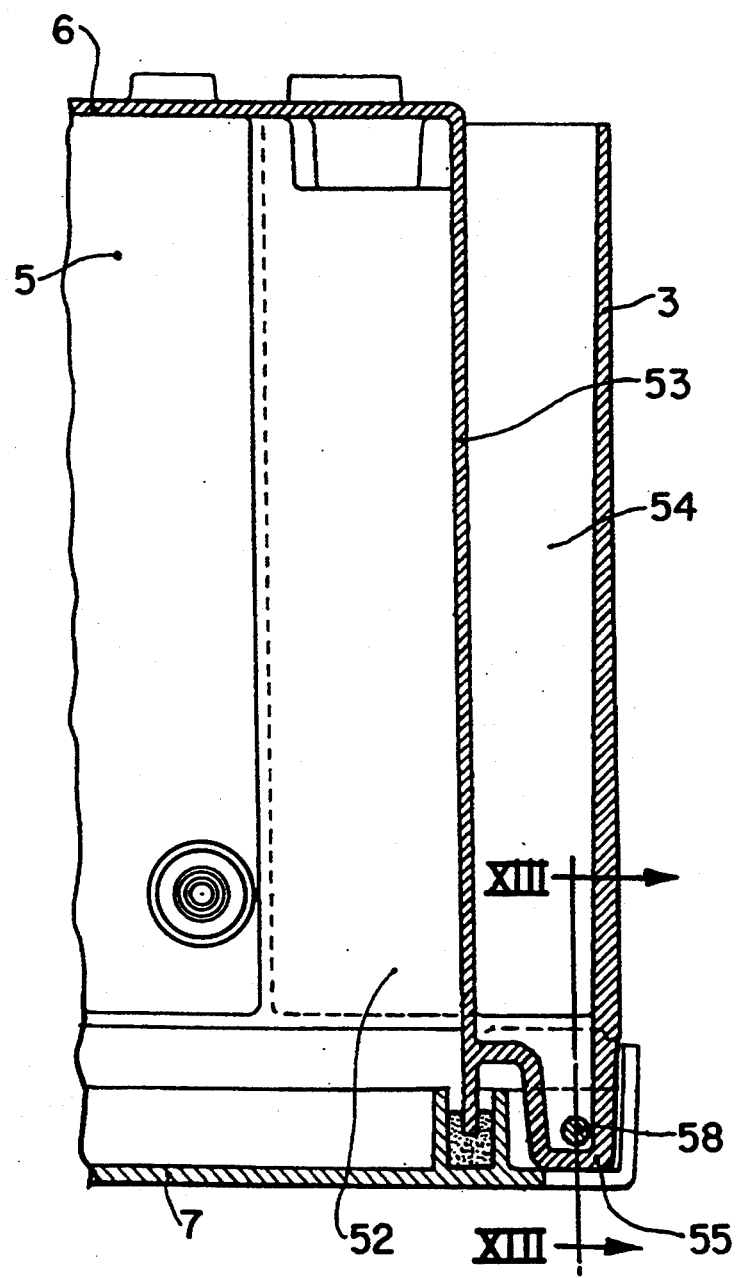
Figure 17:
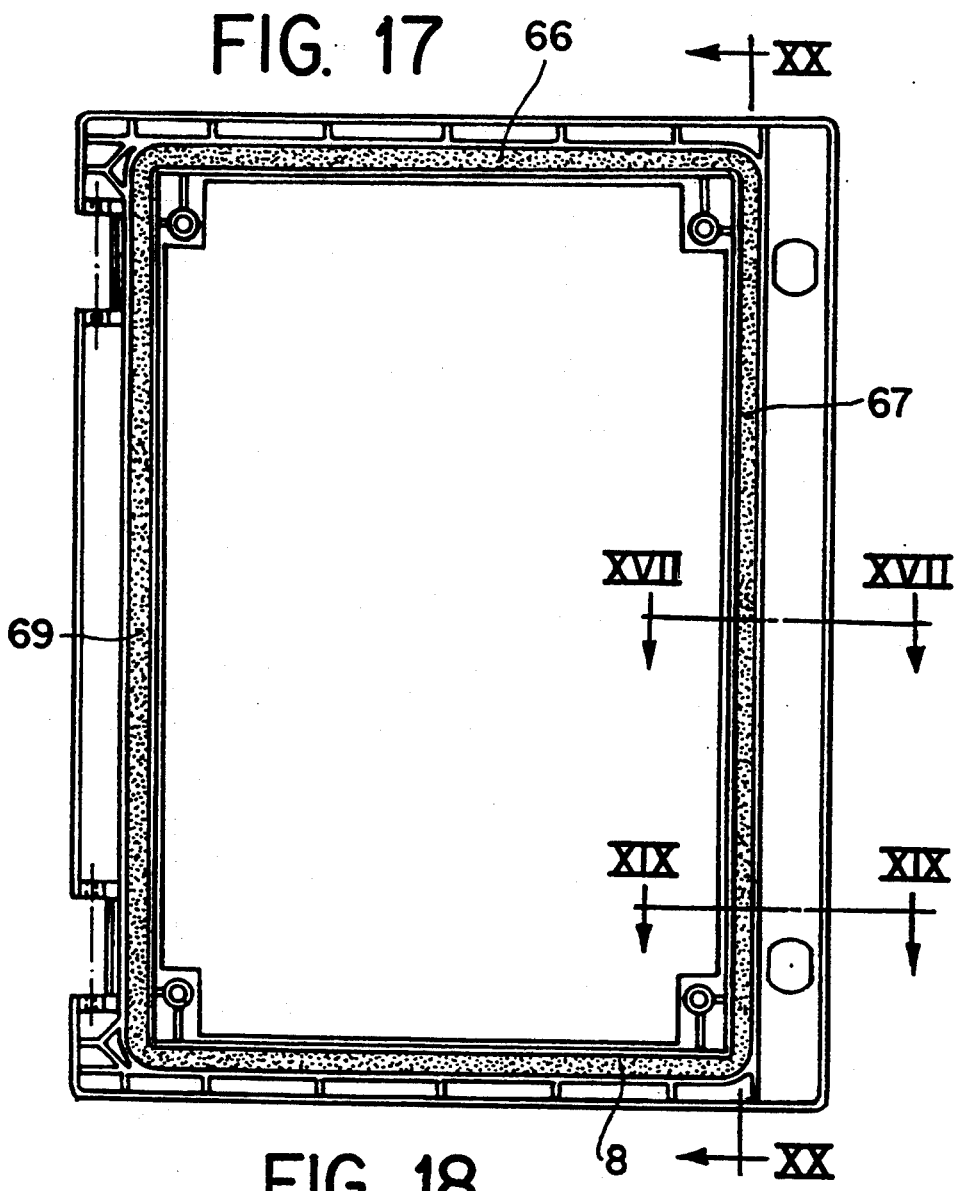
Figure 18:
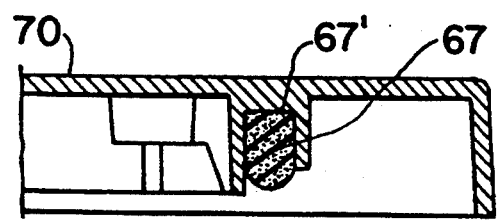
Figure 19:
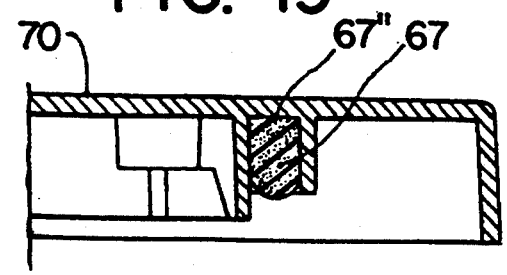
Figure 20:
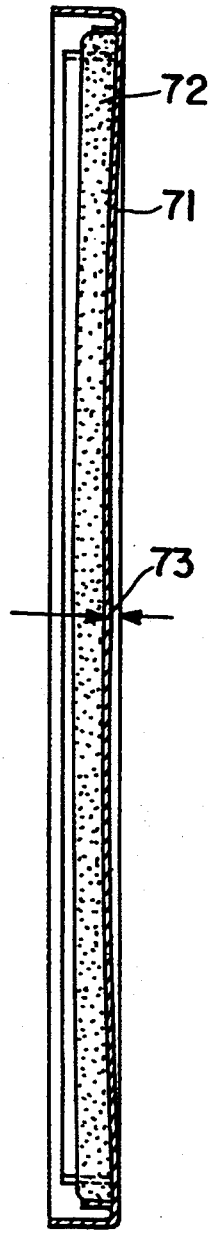
Figure 21:
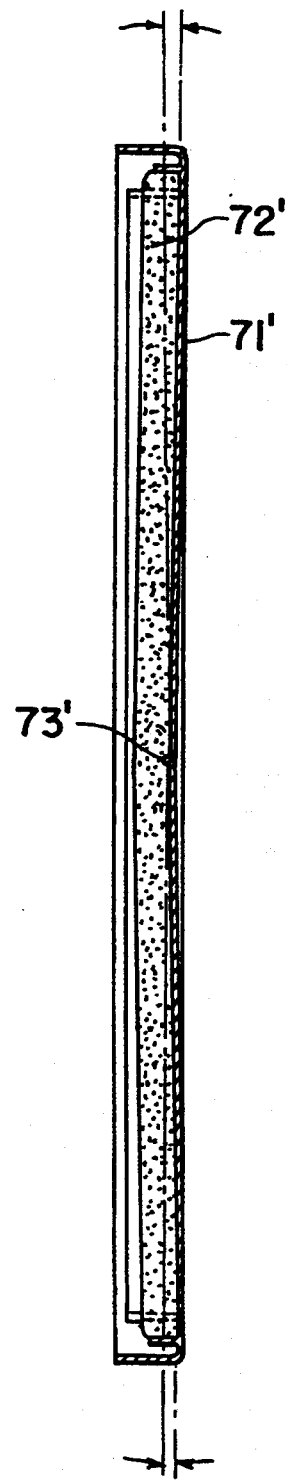
Figure 22:
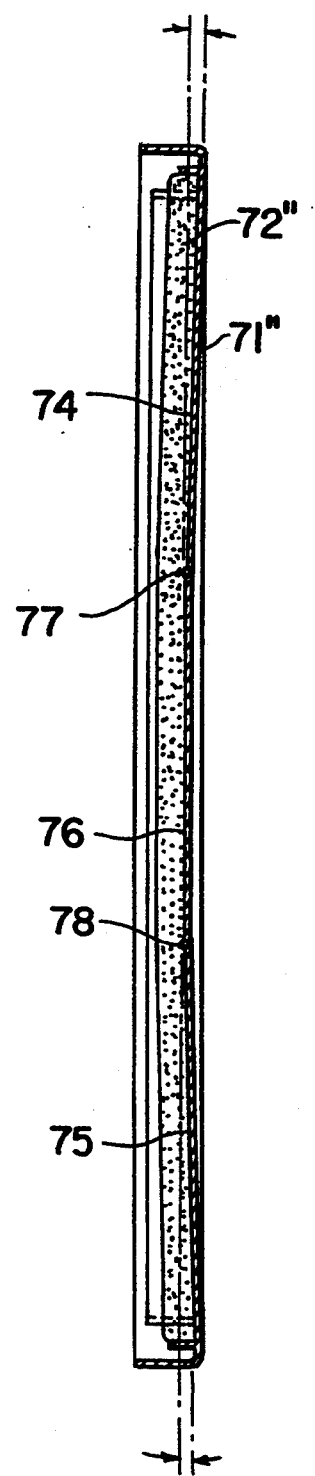

FIGS. 4 and 5 both show details of the construction of the drainage partition;

FIGS. 6 and 7 show an example of construction of the front water drainage by means of a longitudinal channel;

FIGS. 8 and 9 are both representative-views of the front closure, respectively of the upper edge and of the lateral edge with closure, of the cabinet of the invention;

FIG. 10 shows in perspective a detail of the connection of the optional ventilation device inside the cabinet;

FIG. 11 shows a detail of a section through the cutting plane shown in FIG. 10, line XI—XI;

FIG. 12 is a detailed cross-section of the body of the cabinet with its cover, showing the seal and the protruding area intended for the pivoting of the door;

FIG. 13 shows a vertical section in detail of the hinging area for the front door of the cabinet;

FIGS. 14, 15 and 16 show various details of a vertical sealing profile intended to establish contact with the corresponding elastic seal of the door;

FIG. 17 is a front view of the cabinet cover, showing the situation of the seal;

FIGS. 18 and 19 show various cross-sections through the areas of cut shown in FIG. 17, corresponding to various areas of the groove for housing the seal; and FIGS. 20, 21 and 22 show various longitudinal sections of a groove for accommodating the seal of the cabinet cover.

Essentially, the cabinet of the invention has a unitary or monobloc body 1 of pressed construction, particularly of glass-fibre-reinforced polyester, to a general straight parallelepipedic structure with lateral walls 2 and 3, upper and lower walls 4 and 5, and rear wall 6. The front face is open, and coupled to it is a hinged closure door 7 with locking devices of variable type such as 8 and 9.

The manufacture of the unitary body 1 involves the making of various compartments or "chimneys" which occupy the areas of the side walls and of the upper and lower walls which are adjacent to the edges of shorter length of the unitary body, ie. the transversal edges which are perpendicular to the front and rear faces.

Said compartments or "chimneys" adjacent to the transversal edges may extend to the two surfaces or faces adjacent to each edge, adopting a right angled transversal structure, or they may extend to one only of these faces, adopting a simple straight parallelepipedic form.

Said compartments or "chimneys" which may assume transversely the form of a right angle, open in the rear face 6, and in the front part. Two of the edges, such as 10 and 11, of the face 2 have front openings of which one, referenced 12, has been shown, corresponding to the lower edge 10, there existing another similar opening 13 which has been shown in FIGS. 2 and 4, and corresponds to the upper edge 11, while the other two compartments or "chimneys" show frontally, as will be explained, the housings and openings of the hinges of the door.

The said openings are arrived at through the existence of the above-mentioned inner compartments or "chimneys" on one side of the edge 14 limiting the front opening of the cabinet, so that on closing the door 7 the locking devices 8 and 9 fit into the openings 12 and 13 which are arranged outside the locking area of the said front door, this representing a substantial improvement of sealing, as gaps are avoided through which dust could enter the cabinet. This technical characteristic is of great interest in the unitary type cabinet made by pressing.

The present invention includes water drainage means on the upper edge and the lower edge of the front opening, to permit the reversal of the position of use of the cabinet. These draining means will be preferably given the arrangement shown in FIGS. 2 to 5, and there may be seen the various pairs of inclined partitions forming a slight angle relative to the horizontal, denoted on the top edge of the cabinet by numbers 15 and 16, and on the lower edge by numbers 17 and 18. The partitions of each pair meet at the centre of the opening, ie. above the longitudinal plane of symmetry of same, showing in addition a slight outward slant as may be seen in the slightly inclined segment 79 in FIG. 3. In this way, any rainwater reaching the upper edge of the door will be rejected towards the sides and towards the front, along the slants indicated of the partitions mentioned.

Disposed adjacently to the smaller sides of the front opening of the cabinet are two flanges of little height such as 20 at the top, and 21 at the bottom, which permit affording a function of butting for a possible second door or internal protection cover which, in many cases, the cabinet may have joined to it and which has not been shown for the sake of greater simplicity of the drawings.

According to another example of embodiment, the top edge of the front opening may be made as shown in FIGS. 4 and 5, in which there is observed a single longitudinal straight rib 22 which has a front edge slightly higher than the rear edge 23, FIG. 5, this making it possible to obtain a channel for collecting water with outflow on the sides.

By means of the arrangements shown it will be possible to obtain substantial sealing characteristics for the cabinet, supplemented by the provision of elastic seals such as the seal 24 which is combined with the upper edge which defines the front opening of the cabinet, or elastic seals 25 intended to effect the closure of the vertical edge of the front opening of same. In both cases the elastic seals are incorporated in respective grooves of conjugated shape of the closure door 7.

The cabinet of the invention provides certain highly novel technical steps of great effectiveness for the achievement of a more regular pressure along the plain seals or elastic seals 25; these steps consist in that the edge or corresponding rib 14 should be given a profile of a depth varying from the central part towards the edges, so that, after the door of the cabinet has been closed, the pressure on the seal is higher at the centre than at the ends, which will compensate any deformation from bending of the door of the cabinet, such as occurs frequently with large size cabinets. In FIGS. 14, 15 and 16 various forms of embodiment of this characteristic have been shown. In all cases, what is essential is that the central part, which is denoted by 40 in FIG. 14, should be of greater depth than the end parts 41 and 42 of the sealing edge. Thus, for example, in FIG. 14, a version has been shown in which the closing edge 59 has a lightly arched shape throughout its length, with an intermediate deflection 43, so that the depth of the flange or rib 59 is greater at the centre than at the outer edges. Shown in FIG. 15 is a version in which the rib 60 is fitted with two straight sections 44 and 45 which extend from the central point 46 towards the ends, forming respective angles of small magnitude 47. FIG. 16 shows another version in which the central part 46 of the rib 61 is flat, while the end sections 49 and 50 are lightly inclined with angles 51 towards the ends.

Another possibility of embodiment of the means for a differentiated pressure of the seal along same is represented in FIGS. 17 to 22 which relate to an embodiment wherein the bottom of the groove accommodating the seal in the cover of the cabinet has an irregular profile, higher at the centre, so that in this way, the pressure on the seal which will be compressed between the said groove bottom and a straight rib of the body, is greater at the centre than at the ends.

As will be seen in FIG. 18, the cover of the cabinet has a seal of substantially rectangular shape, with sides 66, 67, 68 and 69, with the characteristic that the bottom of the groove, as will be seen in FIGS. 18 and 19, differs in depth from the ends towards the centre, so that in the section shown in FIG. 18, the bottom of the groove 67' which corresponds to the central part of the said side groove has a depth which is greater relative to the outer face 70 of the cover than that relating to the bottom 67'' shown in FIG. 19 which corresponds to an area of the groove accommodating the seal closest to its ends.

For greater clarity, FIGS. 20, 21 and 22 show various versions of grooves housing the seals, in which the characteristic mentioned may be seen.

Thus, for example, in the illustration of FIG. 20, the cover 71 has a longitudinal groove in which the rubber seal 72 is accommodated, and which is characterised in that its bottom is lightly arched from the end towards the centre which is the point of greatest depth of the said groove bottom relative to the rear face of the cover. Said central point has been denoted by reference 73 in the said FIG. 20.

Shown in FIG. 21 is an embodiment in which the cover 77' closing the cabinet has a bottom of groove for accommodating the seal 72' which is characterised by two flat flashings which, forming a small angle, extend from the central point 73' towards the end of said groove.

FIG. 22 represents another form of embodiment wherein it may be observed that the cover 71" of the cabinet has the seal 72" incorporated in a groove the bottom of which has two lightly inclined areas 74 and 75 which join a straight central section 76 at respective intermediate points which have been denoted by 77 and 78.

In all cases it is obtained that the pressure exerted on the seal is variable and to some extent greater at the centre than at the ends, to compensate the possible bending of the cover at the centre, which could result in an inadequate pressure on the seal, with the obvious dangers of loss of seal which this could bring about.

With any of the versions indicated it will be possible to achieve that the comprehensive force be greater at the intermediate part of the closure rib 14, 59, 60, 61, whereby it will be possible to compensate the bending of the door, achieving a better seal.

The construction of the cabinet in accordance with the present invention allows it a greater versatility in that it permits a completely enclosed design of the cabinet or, alternatively, providing it with breathing vents. This permits the application of the cabinet to a diversity of technical uses, such as when it is desired to obtain complete protection from the environment, fully preventing any entry of dust, or when some ventilation of the inside of the cabinet is required without losing the advantages with respect to the entry of dust which has to be kept down to a minimum.

The two versions mentioned will correspond, the former, ie. that with complete sealing, to the embodiment of the cabinet which has been described, while the embodiment with vents is a special embodiment which becomes possible in the cabinet of the invention when there are available the compartments immediately adjacent to the edges described hereinbefore, or "chimneys" which are open at the rear face of the cabinet, thus making possible a construction such as shown in FIGS. 9, 10 and 11, whereby one of the walls of the said compartments immediately adjacent to the edges, such as the wall 26 corresponding to the lower edge, has a weakened area 27 which is defined by a partition of very small thickness and of reduced resistance, as may be seen in FIG. 11, in which the said partition has been shown in the wall 26 of one of the compartments immediately adjacent to the edges which has been denoted by reference 28, and which corresponds to the lower edge 10. With this embodiment it becomes possible to associate an integrated vent 29 with a small frame with grid and the lugs for insertion and holding 30 and 31 intended for clamping in the opening produced on removing the partition of low resistance 27.

By means of this simple arrangement the cabinet of the invention may be used in either of the two previously mentioned versions without any need for any specific complications as regards the tools used, or for producing two separate versions of the cabinet.

Figure 1:
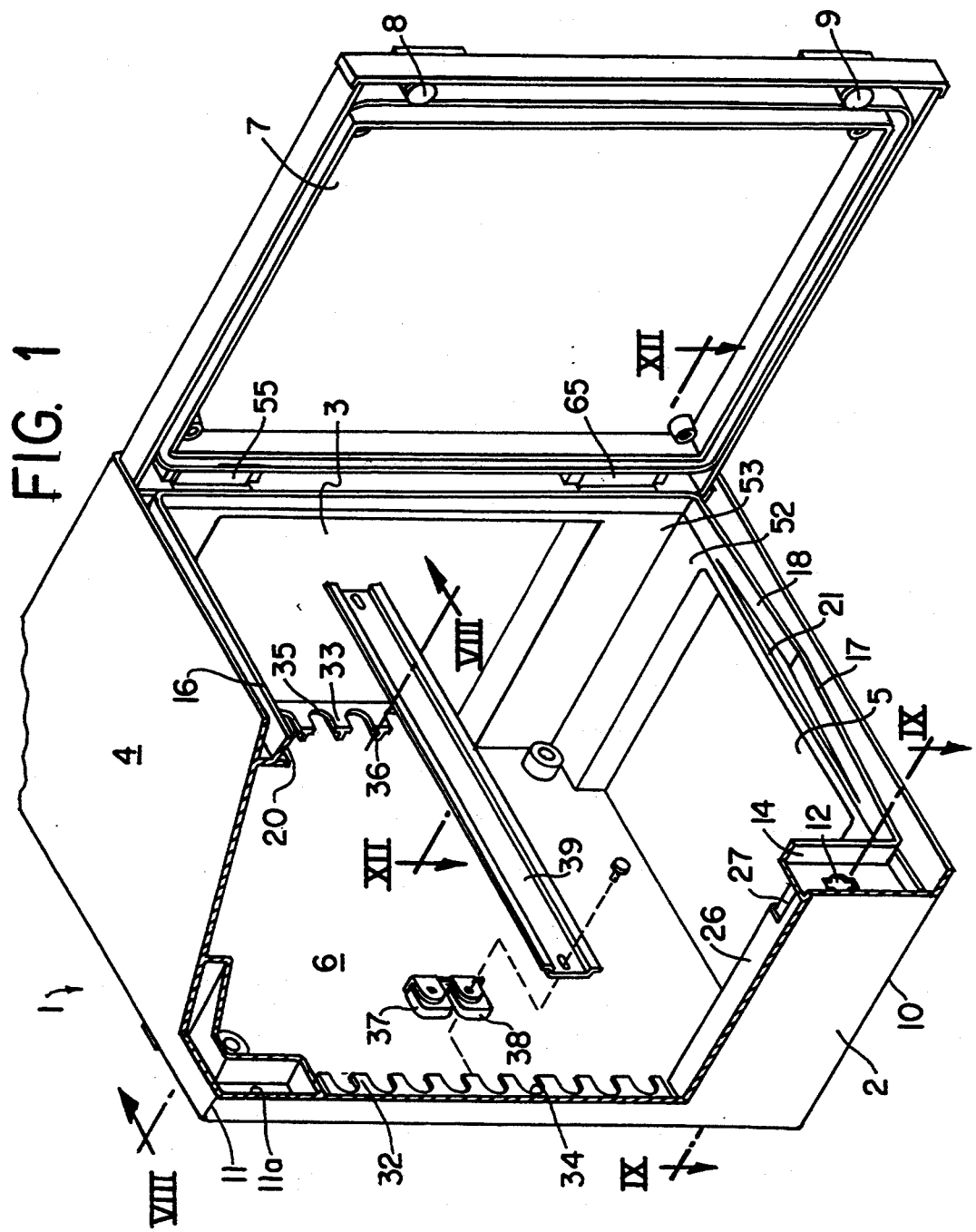
FIG. 1 is a perspective, in part section, of a cabinet constructed according to the invention.

As was mentioned before, the cabinet of the invention has hollow compartments or "chimneys", the cross-section of which is rectangular and which are arranged in the corners of the cabinet, opening at the rear thereof, in such a manner that the compartments corresponding to one of the side faces of the cabinet, for example face 2, end in openings in the front plane of the mouth of the cabinet, such as the openings 12 and 13 shown in FIG. 2, to receive the locking arrangements required for the door of the cabinet. In the opposite side wall 3 there are also the respective compartments or chimneys, the cross-section of which is also rectangular as may be seen in FIG. 1 showing the sides corresponding to the said right-angled structure, denoted by 52 and 53, see FIG. 12, which relate to one of the compartments of the said side face 3. It is characteristic, with the present invention, that the said hollow compartments, for example compartment 54 which is defined by the inner faces 52 and 53, should have at the front face or mouth of the cabinet some protuberances or projections 55 with substantially rectilinear parallelipipedic structure intended to receive the corresponding upper and lower openings 56 and 57, FIG. 13, for placing a vertical pivot axis 58. The pivoting of the lower part of the door 7 is obtained in a manner similar to that already described by means of a second vertical pivot axis 62 and openings 63 and 64 in the end expansion of the inner cavity.

By means of the arrangement described an appreciable simplification is obtained of the operations of manufacture and in particular of drilling of the projection for the siting of the pivot axis 58 which, for the present, is completely solid and means longer drilling time and much higher costs. With the cabinet of the invention it will be sufficient to drill the upper and lower walls of the corresponding projecting sections 55 and 65. Naturally, the openings for the hinges such as 56 and 57 may be obtained direct at the cabinet moulding stage.

The present invention also aims at simplifying considerably the height settings of the cross-members which carry the electrical equipment, as shown in FIG. 1. For the purpose, the side walls 2 and 3 have, close to the rear wall 6, respective serrated structures 32 and 33 which have respective alignments of arched openings 34 and 35, as well as small transverse partitions 36, FIG. 3, defining areas for coupling some removable parts 37, associated in structure with two or more of the said curved openings, with an intermediate groove 38, designed to coincide with the corresponding small partition 36. They are coupled by applying a light pressure and it will be easy to alter the height of the cross-members 39 intended to permit the securing of the electrical equipment inside the cabinet 1.

As will be appreciated, this arrangement is a very simple one not requiring the use of metal springs or fixing screws, it being merely sufficient to insert the removable parts 37 at the desired places along the serrated structures 32 and 33 to enable the corresponding cross-members 39 to be very easily steadied on the said projections.

We claim:
1. A cabinet for electrical equipment, comprising:
   a unitary parallelepipedic structure having first and second parallel lateral walls, an upper wall, a lower wall, a rear wall, and an open front face, said walls and said front face defining an interior space for the receipt of electrical equipment;

a door having first and second lateral edges respectively adjacent said first and second lateral walls of said structure, said door being hingedly connected at said first lateral edge to said first lateral wall and adapted to carry at least once lock adjacent said second lateral edge; and walls defining at least one hollow compartment extending within said interior space along said second lateral wall from said rear wall to said front face and having a rear opening said rear wall and a lock opening at said front face, said lock opening being aligned with and adapted to receive a lock carried by said door such that said lock is received within said hollow compartment.

2. A cabinet for electrical equipment according to claim 1, further comprising at least one additional hollow compartment extending within said interior space along said first lateral wall from said rear wall to said front face and having a hollow extension projecting from said front face of said structure and presenting openings for the insertion of a pivot axis on which said cabinet door is hinged.

3. A cabinet for electrical equipment according to claim 2, wherein said at least one additional hollow compartment extending along said first lateral wall includes two hollow compartments, one hollow compartment adjacent said upper wall and said first lateral wall, and one hollow compartment adjacent said lower wall and said first lateral wall.

4. A cabinet for electrical equipment according to claim 1, wherein said at least one compartment is produced by moulding and said walls defining said at least one hollow compartment include two perpendicular partitions defining inner walls of said compartment, said outer walls of said compartments being formed by said second lateral wall of said structure and one of said upper and lower walls of said structure, wherein one of said partitions has a recess with a wall of reduced thickness, said wall of reduced thickness being easily detachable by pressure applied by a removable breathing vent having a grid, said vent establishing communication through said grid between said interior space and said rear opening of said compartment at said rear wall of said structure.

5. A cabinet for electrical equipment according to claim 1, wherein said first and second parallel lateral walls have transversal edges along said upper and lower-walls and extending from said rear wall to said front face, and said at least one hollow compartment is mounted adjacent one of said transversal edges, forming a rectangular structure with said second transverse wall and one of said upper and lower walls.

6. A cabinet for electrical equipment according to claim 1, further including a rib defining an upper edge and a rib defining a lower edge of said open front face of said structure, each said rib extending in respective pairs of straight partitions which extend outwardly and slightly inclined to the horizontal toward said lateral walls and said interior space, allowing the drainage of water to the sides and to the outside of said cabinet.

7. A cabinet for electrical equipment according to claim 6, further including respective straight flanges joining said inclined partitions of said ribs, spaced interiorly of said front face of said structure and substantially parallel to said rear wall, and supplying an upper area for an optional inside cover for said cabinet.

8. A cabinet for electrical equipment according to claim 1, further including a rib defining an upper edge and a rib defining a lower edge of said open front face of said structure, said ribs being inclined downwardly from said open front face toward said interior space and said rear wall of said structure to form respective straight channels parallel to said upper and lower walls of said structure, said channels exhibiting transversely a grooved shape for the collection of water which can then be expelled laterally from said cabinet.

9. A cabinet for electrical equipment according to claim 1, wherein said lateral walls have inner faces adjacent said interior space, said cabinet further including serrated structures of small width mounted on said inner faces of said lateral walls close to said rear wall of said structure and arranged vertically, said serrated structures being provided with a plurality of curved bottom apertures and small partitions for joining with said rear wall of said structure, said apertures and partitions being able to accommodate, in two or more adjacent curved apertures and corresponding partition, removable parts of conjugated shape to facilitate the fixing at a variable height of cross-members for receiving electrical equipment housed in said cabinet.

10. A cabinet for electrical equipment according to claim 1, further including an elastic seal housed in said door, and a rib defining said front face of said structure and establishing contact with said elastic seal, said rib having a profile which is deeper at the center than at the ends, enabling a greater pressure to be exerted on the corresponding central part of said seal.

11. A cabinet for electrical equipment according to claim 1, wherein said door has an inner face and an outer face, said cabinet further including an elastic seal housed in a groove in said inner face of said door, said groove having a bottom of variable profile so that the maximum thickness of said bottom of said groove, measured relative to said outer face of said door, is at a maximum at the center relative to the ends of said groove, to permit higher compression of said seal in the central area of said seal.

12. A cabinet for electrical equipment according to claim 1, wherein said at least one hollow compartment includes two hollow compartments, one hollow compartment adjacent said upper wall and one hollow compartment adjacent said lower wall.

13. A cabinet for electrical equipment comprising:

a unitary parallelepipedic structure having first and second parallel lateral walls, an upper wall, a lower wall, a rear wall, and an open front face, said walls and said front face defining an interior space for the receipt of electrical equipment;

a door having first and second lateral edges respectively adjacent said first and second lateral walls of said structure, said door being hingedly connected at said first lateral edge to said first lateral wall and adapted to carry at least one lock adjacent said second lateral edge; and at least two walls defining at least one hollow compartment extending within said interior space along said second lateral wall from said rear wall to said front face and having a rear opening in said rear wall and a lock opening at said front face, said lock opening being adapted to receive a lock carried by said door such that said lock is received within said hollow compartment;

wherein one of said at least two walls defining said at least one hollow compartment has an opening for providing communication between said interior space and said hollow compartment.

* * * * *